United States Patent Office 2,886,447
Patented May 12, 1959

2,886,447

TECHNIQUE FOR MAKING CHEWING GUM AND THE RESULTING PRODUCT

Franklin Kramer, Lexington, Harold Rosenthal, Newtonville, and Arthur F. Tole, Melrose, Mass., assignors to General Foods Corporation, White Plains, N.Y., a corporation of Delaware No Drawing. Application February 24, 1959
Serial No. 794,856

7 Claims. (Cl. 99—135)

This invention relates to a process for preparing improved chewing gum which is characterized by a flavor which is controllably released over an extended period of time at a high level.

Chewing gum may comprise a substantially water insoluble, chewable, plastic gum base such as chicle, or substitutes therefor, including jelutong, guttakay, rubber, or certain comestible natural or synthetic resins or waxes. Incorporated with the gum base, and in intimate admixture therewith, may be plasticizers or softening agents, e.g. glycerine; flavoring agents e.g. oil of wintergreen, oil of spearmint, oil of peppermint, licorice, fruit flavors, spice oils, etc.; or sweetening agents which may be sugars including sucrose or dextrose and/or they may be artificial sweeteners such as cyclamates or saccarin. Other optional ingredients may also be present.

It is found that when most flavored chewing gums, such as slab gums, are chewed the initial perception of flavor appears after a minute or more at a low level, and after three or four minutes of chewing the flavor intensity drops to an uninteresting level. It is also found upon analysis, that gum chewed for as long as thirty minutes may retain as much as 60% of the flavor initialy present, and that this proportion of the flavoring agent is thus not effectively used.

It is an object of this invention to provide a chewing gum containing a flavoring composition characterized by an early flavor perception and an extended period of controlled flavor release. A second object of this invention is to provide a chewing gum containing a flavoring composition which is similar in flavor character to that of the original flavoring oil. A third object of this invention is to increase the total amount of flavor released during the chewing period of gums containing the herein described flavoring composition. Other objects of this invention will be apparent to those skilled-in-the-art from the following detailed description of the invention.

In accordance with certain aspects of this invention, chewing gum containing a flavoring composition characterized by an extended flavor perception time, true flavor character, controlled release of a large portion of a flavoring agent, and reduction in amount of flavor oil required, may be prepared by the process comprising forming a freeze-dried gelatin-encapsulated flavor and substantially uniformly distributing said freeze-dried gelatin encapsulated flavor within an all enveloping mass of a chewable gum base. The product chewing gum thus comprises a freeze-dried emulsion of micro-droplets of water-immiscible flavoring agent encapsulated or dispersed within preferably finely divided particles of gelatin, and an all-enveloping mass of a chewing gum base within which the particles are substantially distributed.

The gelatin which may be employed in this invention may be any of the grades and types of gelatin, including these obtained from e.g. tanner's stock, ossein, pigskin, etc. The Bloom of the gelatin which is employed may vary widely. Although a particularly rapid release may be obtained by use of gelatin having a Bloom of about 50 or less, the Bloom may be as high as 200 or even higher. It is a feature of this invention that chewing gums having a fine, soft texture may be obtained when gelatins of high Bloom (e.g. 235 or 250 Bloom) are used. Although the pH of the gelatin solution employed may fall within the range of 2 to 10, it is preferred that it be maintained in the acid region, e.g. 2 to 7.

In carrying out the process of this invention, a gelatin solution may be formed containing 1 to 20, say 5 parts of gelatin per one hundred parts of water, the latter being preferably at temperature of 90° F. to 180° F., say 120° F., during dissolution of the gelatin. The solution may be poured into an appropriate container, preferably in the form of a thin layer, and frozen directly without gelling.

Prior to the freezing of the gelatin and preferably after cooling the solution to 80° F. to 140° F., say 110° F., the desired volatile, water-immiscible flavoring agent may be added to the solution which may then be homogenized to form an emulsion. The flavoring agents which may be employed include oil of peppermint, oil of spearmint, fruit essences, licorice, spice oils and the like. The selected flavoring agent may be added in amount of 10% to 100%, say 50% by weight of the gelatin.

Freeze drying of the gelatin-encapsulated flavor oil may be effected at temperature which may typically be 0° F. down to minus 50° F. Freeze drying under the preferred conditions of 0° F.–15° F. for 6–18 hours permits attainment of a freeze dried emulsion product.

To effect the freeze-drying of the frozen emulsion, the pressure is reduced to a very low value, typically in the micron range less than about 100 microns, e.g. 20–100 microns. During the drying period which may be typically 6–18 hours, the frozen emulsion may be maintained under adiabatic conditions, i.e. no heat will be added. Temperature may drop by 10° F.-20° F. to a final temperature of minus 20° F. to plus 5° F., preferably to about 0° F.

Drying may be continued until the moisture content is lowered to a point approaching 0% moisture, but more typically to about 4%–10% moisture. The dried material may typically have a thread-like structure, the diameter of the threads being of micron size and may typically have an average particle size usually smaller than 100 mesh, and typically 20 to 400 mesh.

When the emulsion of flavoring agent in gelatin solution has been freeze dried, the resultant freeze-dried emulsion has the flavoring agent encapsulated therewithin in the form of discrete micro-droplets. The resultant material comprises a freeze-dried emulsion of discrete micro-droplets of a volatile, water-immiscible flavoring agent dispersed within finely divided particles of gelatin. The flavoring agent is encapsulated or locked within the dry gelatin particles.

Formation of flavored chewing gum may be effected by mixing from 3% to 30%, say 15% by weight of flavoring composition with from 70% to 97%, say 85% by weight of gum base. Typically the gum base will be chicle, although it may be jelutong, guttakay, etc. Other ingredients including sweetening agents, coloring agents, etc. may be present in desired amount.

Although the chewing gums of this invention may be prepared from a single flavoring agent, it is possible to extend the range of properties of the gum by use of combinations of two or more flavoring compositions. For example, it is possible to separately prepare dry flavoring compositions from gelatins of various Blooms, and then to add these compositions to a gum. Such a chewing gum may for example contain a mixture of flavoring compositions prepared from a low Bloom gelatin (characterized by a rapid flavor release) and a high Bloom gelatin (characterized by a slow flavor release). The properties of the chewing gum product will be intermediate to the properties obtained from each of the flavoring compositions when used separately. Specifically if a flavoring composition formed from 50 Bloom gelatin is mixed with a flavoring composition from 200 Bloom gelatin, and the mixture is added to a chewing gum, the product may have a flavor release which is substantially more even over the chewing period than is the case when a single flavoring composition is employed.

Similarly it is possible to modify the properties of the product gum by use of mixtures of flavoring compositions characterized by different ratios of gelatin to oil. If a composition containing 10% flavoring agent by weight of gelatin is mixed with one containing 100% flavoring agent by weight of gelatin (i.e. equal parts of gelatin and flavoring agent), the resulting blend of flavoring composition will yield a chewing gum having a more even liberation of flavor than is obtained by use of either flavoring agent alone.

Controlled liberation of flavor of the product chewing gum, may also be obtained by using mixtures of flavoring compositions (a) of different particle size, the resulting gum deriving much of its initial flavor from the smaller particles and much of its later flavor from the larger particles; or (b) formed from gelatins of different pH, the composition formed from gelatin of higher pH (e.g. 9) giving quick release of flavor, while that formed from lower pH (e.g. 2..5) giving slower release.

It is also possible to obtain chewing gum products having extended flavor liberation time by use of the herein described fixed flavors in combination with unfixed flavors, whereby the initial flavor sensation may be derived from the unfixed flavor and the later sensation from the fixed flavor. A particularly desirable product contains unfixed flavor and freeze-dried flavor in about equal proportions.

The resulting chewing gum may include an all-enveloping mass of gum base such as chicle, within which is substantially uniformly distributed particles of free-dried gelatin-encapsulated flavoring agent. Although the mixing procedure follower may result in transfer of some of the flavoring agent from the gelatin-encapsulation to the gum, substantially all of the flavoring agent which was admitted will still be found in the gelatin-encapsulation after mixing.

It is characteristic of this chewing gum product that it retains its flavor under conditions of vigorous chewing for extended periods which may be double that of compositions heretobefore known to those skilled-in-the-art. For example, the flavor perception time may be six minutes or longer, in contrast to the usual three minutes which is the flavor perception time of comparable products heretofore known.

The chewing gum so formed is also characterized by high degree of flavor release. The products herein described may retain as little as 25%–35% of the flavor originally present after mastication for 30 minutes. Gums heretofore available, when chewed for the same time, are found to retain as much as 60% of the flavor originally present which is being released at such a slow rate that intensity of flavor is at an uninteresting level.

The greater availability of flavor by use of the flavoring compositions herein described also permits attainment of high flavor level in the chewing gum products with use of lower amounts of the flavoring oils.

Chewing gums prepared with the flavor composition in accordance with this invention, have a flavor character more nearly that of the original flavor oil than chewing gum prepared by the direct incorporation of the flavoring oil into the chewing gum.

The following specific example will serve to illustrate a preferred embodiment of this invention:

*Example*

According to a specific example of this invention, 5 parts by weight of 50 Bloom gelatin were added to 95 parts by weight of water at temperature of 150° F. The mixture was agitated until the gelatin completely dissolved and then the solution was cooled to 120° F. Two parts by weight of methyl salicylate (oil of wintergreen) were added to the solution and homogenized to form an emulsion. The emulsion was poured into a shallow container to form a layer about 0.1 inch thick. This was frozen in a bath at minus 30° F. The frozen emulsion was then subjected to a pressure of 50 microns under which it was adiabatically maintained for 12 hours. Moisture content of the freeze-dried material was about 4%. The product readily disintegrates into particles of about 100–200 mesh.

One hundred parts by weight of chicle were mixed with 18 parts by weight of the above-prepared freeze-dried gelatin-encapsulated flavor. Three hundred parts of sucrose and 100 parts corn syrup were added. Mixing was effected in a ribbon blender with jacketed side walls of the type manufactured by the Baker Perkins Company.

A taste test may be made to compare a chewing gum product of this invention with a standard chewing gum containing the same total amount of flavor in unfixed form. During the tests, 0.5 inch x 0.05 inch x 0.0625 inch slabs of each gum may be separately chewed and the following noted: time and intensity of initial flavor extent of flavor burst, duration of interesting flavor level, and approximate total time during which flavor was available. In these tests, the rating of flavor intensity may be measured by the person chewing, on a scale ranging from 0 to 10, the level of 1 indicating threshold flavor intensity just discernable to the taste, and a level of 10 indicating a maximum intensity above which the sensation originating in the flavor is unpleasant.

The commercially available standard containing unfixed flavor in chicle was characterized by initial indication of flavor at a level of 1 after about 7–8 seconds. Intensity rose to 3 at about 15 seconds, and thereafter at a slower rate to a level of 6 at about 60 seconds. At this point, flavor intensity dropped off to 3 after about 90 seconds. At about 2 minutes, the flavor intensity was at the uninteresting low level of 1.5. After 4 minutes of chewing, the flavor had dropped below the threshold value of 1, and the standard gum was flat and lifeless.

Initial flavor liberation in a sample prepared according to this invention and containing freeze-dried flavoring composition occurs more quickly than does that of the standard. Intensity rises to a level which may be much higher than that of the standard. After 6 minutes, the intensity drops to a point which is equal to that of the highest for the standard. Flavor will be very apparent for total time of about 10 minutes at which point the intensity drops to the threshold value. During the entire period of the test, the flavor will be rich and full-bodied and substantially true in character.

It is apparent to the person making the chewing test that the freeze-dried sample prepared in accordance with this invention is superior to the sample containing the same amount of flavoring oil in unfixed form. Specifically, the freeze-dried product of this invention is characterized by extended flavor perception time, early flavor release, a true flavor character which is substantially that of the flavoring agent, and a high degree of flavor release.

The term "encapsulate," as used herein, means that after the flavoring oil has been emulsified in the gelatin solution and the gelatin has been freeze-dried, each of the very fine particles of gelatin will be found to contain uniformly distributed micro-droplets of the flavoring oil.

Although I have herein described a specific example showing certain details of my invention, it will be apparent to those skilled-in-the-art that various modifications and changes may be made which come within the scope of this invention.

This application is a continuation-in-part of application Serial No. 778,601, filed December 8, 1958 for Process for Making Chewing Gum and Product and of application Serial No. 595,610, filed July 3, 1956 for Product and Process, by the same inventors.

What is claimed is:

1. A chewing gum comprising a freeze-dried emulsion of discrete micro-droplets of a volatile water-immiscible flavoring agent dispersed in finely-divided particles of gelatin and an all-enveloping mass of a chewable gum base within which the particles are substantially uniformly distributed.

2. A chewing gum as claimed in claim 1 wherein said chewable gum base contains free, unfixed flavoring agent.

3. A chewing gum comprising 3–30% by weight of a freeze-dried emulsion of discrete micro-droplets a volatile water-immiscible flavoring agent dispersed in finely-divided particles of gelatin and an all-enveloping mass of a chewable gum base within which the particles are substantially uniformly distributed.

4. A chewing gum comprising a freeze-dried emulsion of discrete micro-droplets of a volatile water-immiscible flavoring agent dispersed in 20–400 mesh size particles of gelatin, and an all-enveloping mass of a chewable base within which the particles are substantially uniformly distributed.

5. A chewing gum comprising a freeze-dried emulsion of discrete micro-droplets of a volatile, water-immiscible flavoring agent dispersed in finely-divided particles of gelatin, an all-enveloping mass of a chewable gum base within which the particles are substantially uniformly distributed, and free unfixed flavoring agent uniformly distributed with said all-enveloping mass of chewable gum base.

6. The method of preparing a chewing gum comprising forming an aqueous emulsion of a volatile, water-immiscible flavoring agent and a gelatin solution, freeze drying said emulsion to form solid freeze-dried gelatin containing volatile, water-immiscible flavoring agent encapsulated within finely divided particles of gelatin, and substantially uniformly distributing said freeze-dried gelatin-encapsulated flavoring agent within an all-enveloping mass of a chewable gum base.

7. The method of preparing a chewing gum comprising forming a 20–400 mesh solid freeze-dried emulsion of a volatile, water-immiscible flavoring agent encapsulated within finely divided particles of gelatin, and substantially uniformly distributing said freeze-dried gelatin-encapsulated flavoring agent within an all-enveloping mass of a chewable gum base.

References Cited in the file of this patent

UNITED STATES PATENTS

| | | |
|---|---|---|
| 1,526,039 | Arkell et al. | Feb. 10, 1925 |
| 1,993,289 | Stokes et al. | Mar. 5, 1935 |
| 2,157,839 | Wertheimer | May 9, 1939 |
| 2,258,567 | Epstein et al. | Oct. 7, 1941 |
| 2,369,847 | Olsen et al. | Feb. 20, 1945 |